Figure 1:
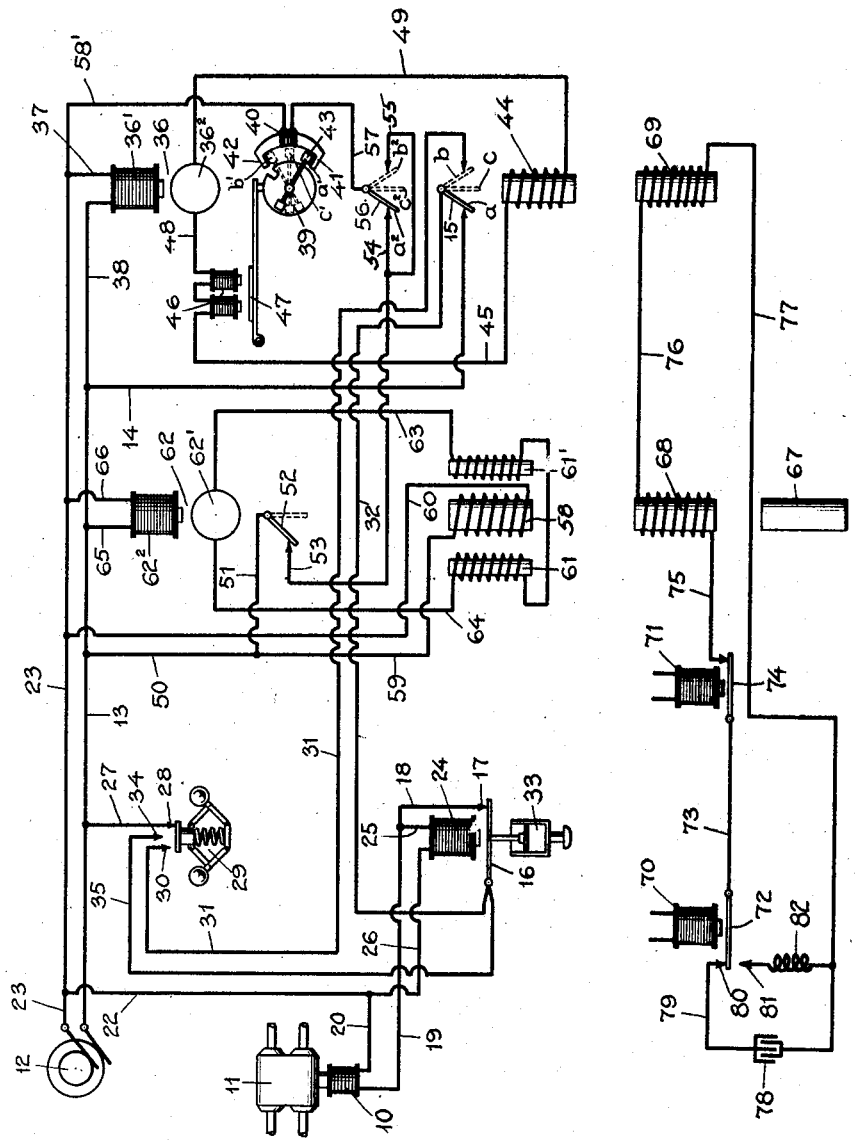

Aug. 19, 1930.　　A. G. SHAVER　　1,773,155

INDUCTION TRAIN CONTROL SYSTEM

Filed Nov. 6, 1923　　2 Sheets-Sheet 1

INVENTOR
Archibald G. Shaver

BY
Meyers & Cavanagh
ATTORNEYS

Aug. 19, 1930.  A. G. SHAVER  1,773,155
INDUCTION TRAIN CONTROL SYSTEM
Filed Nov. 6, 1923  2 Sheets-Sheet 2
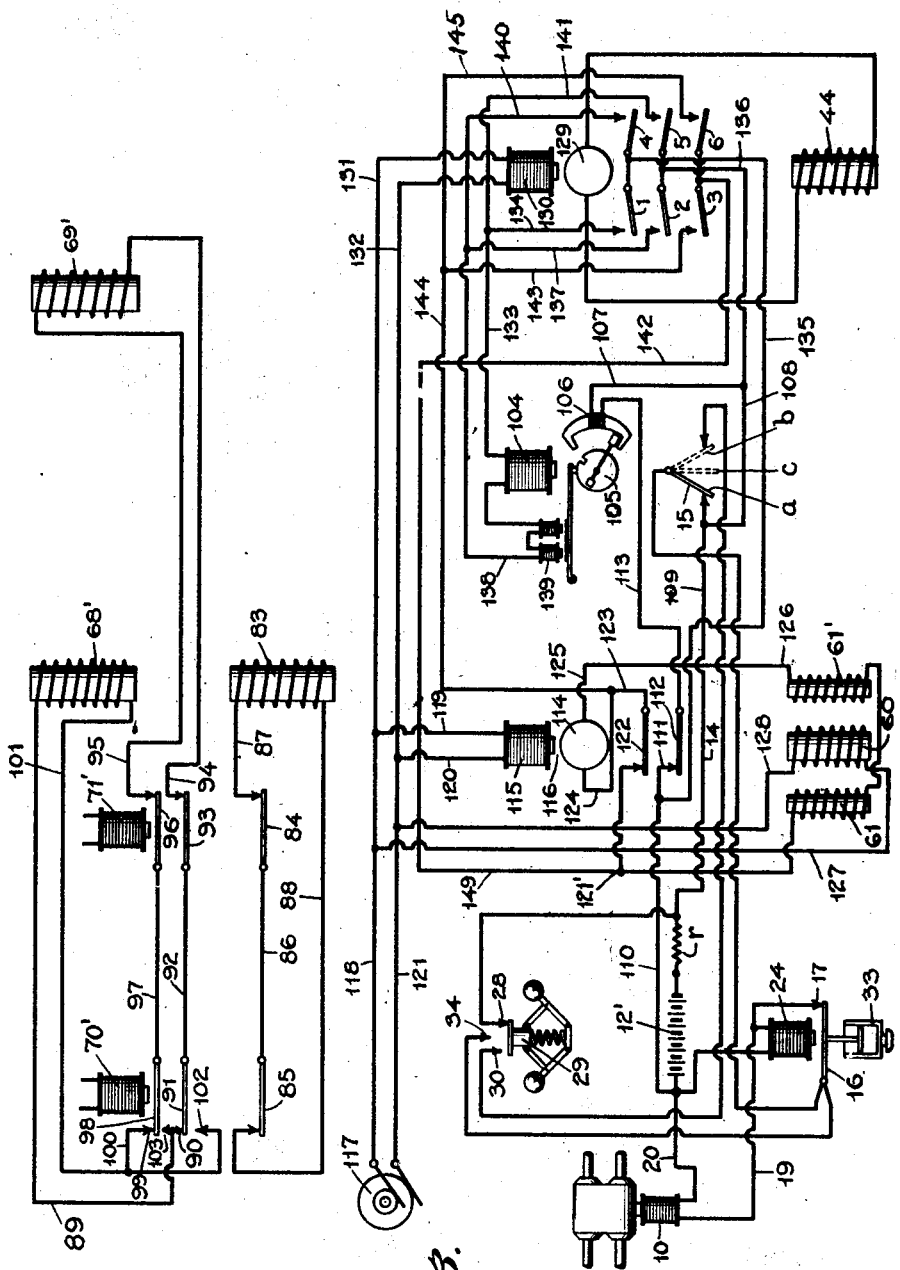
INVENTOR
Archibald G. Shaver
BY
Meyers + Cavanagh
ATTORNEYS Patented Aug. 19, 1930

1,773,155

UNITED STATES PATENT OFFICE

ARCHIBALD G. SHAVER, OF CHICAGO, ILLINOIS, ASSIGNOR TO THE REGAN SAFETY DEVICES COMPANY, INC., OF NEW YORK, N. Y., A CORPORATION OF NEW YORK

INDUCTION TRAIN-CONTROL SYSTEM

Application filed November 6, 1923. Serial No. 673,138.

This invention relates to train control systems, and has special reference to the provision of an improved train control system of the induction type.

A principal object of the present invention comprehends the provision of an induction train control system in which train carried mechanism is operated to produce a plurality of different effects responsive to the cooperation between vehicle carried and roadside inductive mechanism, the construction and the cooperation being such that the vehicle carried inductive mechanism is influenced by the roadside inductive mechanism to produce a controlling such as a tripping action of the vehicle carried mechanism to control the movement of the vehicle and is then influenced under one or more different roadside conditions to produce a modifying or resetting action of the vehicle carried mechanism.

A further principal object of the present invention relates to the provision of an inductive system of the type referred to in which novel means is provided inductively controlled from the roadside for actuating the vehicle carried indicating means selectively to any of a number of positions combined with an inductively controlled means for holding the indicating means in actuated position. A correlated object of the invention includes the provision of an inductive system in which the vehicle carried and roadside inductive means are operated by means of a vehicle carried source of energy.

To the accomplishment of the foregoing and such other objects as may hereinafter appear, my invention consists in the elements and their relation one to the other, as hereinafter particularly described and sought to be defined in the claims, reference being had to the accompanying drawings which show preferred embodiments thereof, and in which:—

Fig. 1 is a diagrammatic view showing the vehicle carried apparatus and circuits and part of the roadside apparatus cooperating therewith, Fig. 2 is a diagrammatic view of a modification of the roadside apparatus, and Fig. 3 is a diagrammatic view of a modification of the vehicle apparatus.

In the train control system of the present invention, for directly controlling the movement of the train there is provided an electrically operated device for controlling the operation of the air brake system, the said device being under the control of cooperating train and roadside mechanism and being operated thereby in accordance with roadside conditions. The electrically operated device comprises in the preferred construction an electromagnet 10 which controls the operation of a combined reservoir and brake valve 11 of the type disclosed for example in the patent to A. G. Shaver No. 1,411,526 of April 4, 1922, and in the copending application of Allen B. Kendall, Ser. No. 443,046 of Feb. 7, 1921, the said reservoir and brake valve functioning upon the deenergization of the electromagnet 10 for cutting off the supply of air from the main reservoir of the air brake system to the engineman's brake valve, and for opening the train pipe to exhaust, the electromagnet 10 being normally energized to hold open the communication between the main reservoir and the engineman's brake valve and to close the train pipe to exhaust.

For directly controlling the operation of the electromagnet 10, there may be provided any preferred character of control circuits, and to exemplify the principles of the present invention, the control circuits may comprise the manual-automatic speed control circuits set forth in the copending application of Shaver & Rosenzweig, Ser. No. 673,088, filed Nov. 6, 1923. These controlled circuits for the electromagnet 10 include a circuit which is normally energized as under "clear" roadside conditions by a train carried source of energy, such for example as the A. C. generator 12, the said circuit including the common conductor 13, conductor 14, movable indicating means 15 which is operable in response to roadside conditions as will be detailed hereinafter to assume any one of the three positions $a$, $b$ and $c$, the full line inclined position $a$ corresponding to the "normal" or "clear" position, the inclined dotted position

*b* corresponding to one of the "non-clear" positions such as the "caution" position, and the vertical dotted line position *c* corresponding to another "non-clear" such as the "danger" position, the said circuit further including the conductor 32, the manually operable contact mechanism 16 normally closed at the contact 17, the conductor 18, conductor 19, electromagnet 10, conductors 20 and 22, and common conductor 23. This "normal" or "clear" circuit is normally closed and is maintained closed by means of a stick relay 24 which is connected in parallel with the magnet 10 by means of the conductors 25 and 26 connected respectively to the conductors 19 and 20. Under "normal" or "clear" conditions with the indicating means 15 in the position *a*, and with the contact mechanism 16 closed on its front contact 17, the brake controlling magnet is energized and maintained energized to permit the vehicle to proceed.

The controlling circuit mechanism for the magnet 10 further includes a "caution" circuit which is under the control of the speed of the train and is so operative that when the vehicle receives a "caution" indication and a prescribed medium speed is exceeded, the electromagnet 10 is automatically operated to bring the vehicle to a halt, which operation may, however, be modified to place the speed of the vehicle under the control of the medium permissive speed provided the engineman is alert and intervenes, and provided the speed of the train has been reduced to such permissive speed, this "caution" circuit comprising the generator 12, common conductor 13, conductor 27, common contact 28, a speed controller 29 actuated by the speed of the vehicle, a medium permissive speed contact 30 closed when the vehicle is reduced to or below the medium permissive speed, conductor 31, indicating means 15 in position *b*, conductor 32, contact mechanism 16, contact 17, conductors 18 and 19, magnet 10, and conductors 20, 22 and 23. With this circuit it will be seen that when the indicating means 15 is moved to the "caution" position *b*, the relay 24 which is in parallel with the magnet 10 will be deenergized to open the circuit at the contact 17 if the speed controlled contact 30 is open, and that when the speed of the vehicle is reduced to close the contact 30 under such conditions, the circuit is in a condition to be closed by the manual intervention of the engineman who operates a push key mechanism 33 for closing the contact 16 and for reenergizing the magnet 10 to forestall or modify the automatic operation produced.

The speed controlled circuit mechanism further includes a low permissive speed circuit which is normally open but which may be closed to forestall or modify an automatic operation of the electromagnet 10 when the speed of the vehicle has been reduced to a low permissive speed, such circuit including the generator 12, conductor 13, conductor 27, common contact 28, speed controller 29, low speed contact 34, conductor 35, contact mechanism 16, contact 17, conductors 18 and 19, magnet 10, and conductors 20, 22 and 23. This circuit is normally open at the contact 34, and may be closed when the speed of the vehicle has been reduced to the low permissive speed to energize the electromagnet 10 and permit the vehicle to proceed under the control of this prescribed low speed.

For controlling the operation of the brake controlling circuits and for operating the same in response to and in accordance with roadside or traffic conditions, there is provided cooperating train and roadside inductive mechanism which functions to cause the make and break indicating means 15 to be operated selectively to the positions *a*, *b* and *c*. The train mechanism for controlling the action of the indicating means includes the provision of an operating means such as an operating unit 36 which may include a field coil 36' connected to the generator 12 by means of the conductors 37 and 38 and normally energized thereby, and an armature coil $36^2$ normally unenergized and intermittently controlled by inductive means in the movement of the vehicle over the roadbed, as will be described presently, the train mechanism further including a movable plate 39 connected with coil $36^2$ which operates the indicating means 15, and which is movable into positions *a'*, *b'* and *c'* corresponding to positions *a*, *b* and *c* of the indicating means 15, the plate 39 being movable into either of the positions *a'* and *b'* by the selective energization of the armature coil $36^2$ and being held in either of such positions by a holding means such as a holding magnet 40 provided with the spaced selectively operable poles 41 and 42, either of which cooperates with an armature member 43 fixed to and movable with the movable plate 39, the said holding magnet being controlled by another circuit which will be described presently, and operable so that the indicating means 15 is held by the holding means in a position to which it has been moved by the operating means until a change therein is produced when the vehicle passes a control station on the roadbed. The movable plate 39 is biased towards its neutral position either by gravity or any suitable magnetic means (not shown).

For controlling the operation of the operating unit 36, there is provided an inductive circuit as heretofore indicated and which as shown in the form of the invention depicted in Fig. 1 is directly connected to the armature coil $36^2$, said inductive circuit including an inductor 44, a conductor 45, a locking magnet 46 which cooperates with a neutral lock 47 operative for holding the plate 39 in the neutral or "danger" position *c'*, conductor 48, coil of armature $36^2$ and conductor 49. This circuit is normally unenergized and as will be presently described, when the vehicle passes a control station, the coil 36² is selectively energized to actuate the plate 39 to either of the positions $a'$ or $b'$ or is nonenergized to permit the plate 39 to move to the "neutral" position $c'$.

For the purpose of holding the plate 39 in either of the positions $a'$ or $b'$ while the vehicle is moving betwen control stations, the holding magnet 40 is normally energized by a circuit including the generator 12, conductors 13, 50 and 51, a contact 52 normally closed and maintained closed by means to be described presently, conductor 53, either of conductors 54 or 55, a contact 56 which is operated by the movable plate 39 and is movable into positions $a^2$, $b^2$ and $c^2$ corresponding to the positions $a$, $b$ and $c$, conductor 57, holding magnet 40, and conductors 58' and 23. With this circuit arrangement, it will be seen that when the contact 56 is either in the "clear" or "caution" positions $a^2$ or $b^2$, the circuit will be closed by the contact 52 to energize the holding magnet for holding the indicating means 15 and the operating parts therefor in either "clear" or "caution" position.

As heretofore indicated, the holding magnet is controlled by an inductive circuit which is influenced by the conditions on the roadside, and to this end I provide inductive means for controlling the operation of the circuit for the holding magnet 40, the said inductive means preferably comprising an energizing inductor 58 normally energized from the generator 12 and connected thereto by means of the conductors 13, 50, 59, 60 and 23, and one or a plurality of receiving inductors 61 and 61' connected to an armature coil 62' of a relay 62 by means of the conductors 63 and 64, the relay further including a field coil 62² normally energized from the main lines 13 and 23 and connected thereto by means of the conductors 65 and 66.

With this described construction, it will be seen that normally the energizing inductor 58 will energize the inductors 61 and 61' for effecting the energization of the relay 62 so that the contact 52 is normally closed with the indicating means 56 in either the "clear" or "caution" position to maintain the circuit for the holding magnet 40 closed.

The vehicle carried mechanism and inductive circuits therefor are intermittently controlled by roadside mechanism located at spaced controlling stations along the roadbed, one form of such roadside mechanism being shown in Fig. 1 of the drawings, the roadside mechanism including an inert element 67 over which the inductor combination 58, 61 and 61' is movable, the roadside mechanism further including a receiving inductor 68 arranged in alinement with the inert element 67 (these elements being parallel to the rails), adapted to cooperate with the vehicle carried energizing inductor 58, and a transmitting inductor 69 arranged to cooperate with the vehicle carried receiving inductor 44, the said roadside inductors being connected in a circuit controlled by a distant magnet 70 and a home magnet 71, said circuit including a contact 72 under the control of the magnet 70, conductor 73, a contact 74 under the control of the magnet 71, conductor 75, inductor 68, conductor 76, inductor 69, conductor 77, a capacitance 78, conductor 79, and front contact 80. This inductive roadside circuit is normally closed as traced when the home and distant magnets 71 and 70 are energized, the said magnets 70 and 71 being controlled in any manner well known to those skilled in the art, the same being no part of my present invention. When, however, the distant magnet 70 is deenergized as under "caution" roadside conditions, the front contact 80 is opened and the back contact 81 is closed to substitute an inductance 82 for the capacitance 78 in the inductive circuit, this so that the phase condition of the circuit is changed, and when the home magnet 71 is deenergized as in response to "danger" roadside conditions, the circuit is opened at the contact 74.

In the operation of the system shown in Fig. 1 with the vehicle carried mechanism in the "clear" running condition as indicated, when the vehicle carried inductor combination 58, 61 and 61' moves over the inert element 67, the lines of flux from the energizing inductor 58 to the inductors 61 and 61' are shunted so that the circuit controlling the relay 62 is practically deenergized, the energization of the armature 62' being insufficient to hold the contact 52 in full line closing position and the said contact will be moved to the open dotted line position shown, the opening of this contact resulting in the deenergizing of the holding magnet 40 so that the movable armature 39 is free to be actuated or moved to positions $a'$, $b'$ or $c'$. The holding means and therefore the indicating means 15 is thus tripped by the cooperation of the vehicle inductor combination and the inert element 67. After this cooperation, however, the energizing inductor 58 moves over the roadside receiving inductor 68 to energize the same and the impulse received by the receiving inductor 68 will be transmitted to the transmitting inductor 69 with current of a given phase under "clear" roadside conditions and with current of a phase opposite to the given phase under "caution" conditions, depending on whether the capacitance 78 or the inductance 82 is in the roadside inductive circuit. If, however, this circuit is open as under "danger" conditions, no impulse will be transmitted to the inductors 69. It will be understood that the train carried elements move over the roadside inductor elements 67, 68 faster even at its lowest speed than the speed which would permit of the deenergization of the vehicle carried circuits.

Thus under "clear" roadside conditions when the inductors 58, 68, 69 and 44 cooperate, an impulse of a given phase will be transmitted to the receiving inductor 44 for momentarily energizing the armature coil $36^2$ to move elements 39, 15 and 56 to the "clear" position indicated, while under "caution" conditions the inductor 44 will receive an impulse of a phase opposite to the given phase for reversely energizing the armature magnet $36^2$ with current of a phase opposite to the given phase, the phase displacement between the currents in the elements 36' and $36^2$ resulting in the movement of the actuated elements 39, 15 and 56 to the "caution" position. Under "danger" conditions due to the non-energization of the conductors 69 and 44 the actuated parts of the vehicle carried mechanism will be moved to the "danger" position.

After the vehicle carried mechanism passes the roadside inductors 67, 68 and 69, the energizing inductor 58 again energizes the secondary inductors 61 and 61' so that the contact 52 is closed, and after the contact 56 has been moved by the operating magnet to either the "clear" or "caution" position $a^2$ or $b^2$, the holding magnet 40 will again be energized to hold the actuated parts in either the "clear" or "caution" position until the next control station is reached. Thus with the construction provided and with the type of roadside mechanism shown in Fig. 1, the vehicle carried mechanism is controlled intermittently at each control station to trip the indicating means and to reset the same selectively depending upon the roadside condition. It will be further seen that the indicating means when reset will be held until the next control station is reached, and that in the absence of any actuation of the indication means to a clear or caution position the holding means will be rendered inoperative and will persist in inoperative condition and that when the indicating means is reset the holding means will be restored to the operative condition.

Referring now to Fig. 2 of the drawings, I show an optional roadside mechanism which operates to produce a tripping of the vehicle carried mechanism only under "caution" or "danger" conditions instead of a tripping at each control station. In the roadside mechanism shown in Fig. 2, the roadside tripping means comprises an inductor 83 controlled by the home and distant magnets 71' and 70' at the contacts 84 and 85, said inductor being placed in a circuit comprising the contact 85, conductor 86, contact 84, conductor 87, inductor 83, and conductor 88. Under "clear" roadside conditions this circuit is closed so that when the energizing inductor 58 traverses the inductor 83 substantially no change takes place in the flux from this energizing inductor to the vehicle inductors 61 and 61' so that no tripping is effected under such "clear" roadside conditions. However, under "caution" or "danger" conditions the circuit to the inductor 83 will be opened either at the contact 85 or 84 so that the inductor 83 becomes in effect an inert element to trip the vehicle carried mechanism. The resetting inductive mechanism of Fig. 2 is also a variation of that shown in Fig. 1 and comprises the inductors 68' and 69' controlled in a circuit by the magnets 70' and 71' so that under "clear" conditions the inductor 68' transmits to the inductor 69' energy of a given phase through the circuit including inductor 68', conductor 89, front contact 90, contact 91, conductor 92, contact 93, conductor 94, inductor 69', conductor 95, contact 96, conductor 97, contact 98, front contact 99, conductor 100, and conductor 101. Under "caution" conditions the inductor 69' is energized by current of an opposite phase, the circuit connections between the inductors being reversed by the movement of contacts 91 and 98 to close back contacts 102 and 103 connected respectively to the conductors 101 and 89.

Referring now to the modification of the invention shown in Fig. 3, the controlling circuits for controlling the operation of the magnet 10 are similar to those heretofore described in connection with Fig. 1 and are designated by similar reference characters, with the exception that the circuits are energized by battery 12' instead of the alternating current source of energy 12.

Still referring to Fig. 3, the operating means and the holding means for the indicating means 15 are also modified, the operating means comprising an operating magnet 104 arranged in a normally open circuit and selectively actuated to operate the armature 105 and the indicating means 15, and the holding means 106 is arranged in a normally closed circuit comprising the holding magnet 106, conductor 107, conductor 108, conductor 14, resistance $r$, battery 12', conductor 110, conductor 111, contact 112, and conductor 113. The contact 112 is normally maintained closed by the energization of the armature magnet 114 and the field magnet 115 of a relay 116, the field magnet being energized from the A. C. source 117 and connected thereto by means of the inductors 118, 119, 120 and 121, and the armature 114 being energized by an inductive circuit including the inductor 61', inductor 61, conductor 121', contact 122, conductor 123, conductor 124, the armature 114, and conductors 125 and 126, it being understood that the inductors 61 and 61' normally receive energy from the energizing inductor 60 which is connected to the generator 117 and more specifically to the conductors 118 and 121 by means of the conductors 127 and 128.

In the operation of the system shown in Fig. 3, when the inductor combination 60, 61, 61' reaches a control station where a tripping operation of the vehicle mechanism is produced, the armature 114 is substantially deenergized, opening the contacts 112 and 122, this resulting in the deenergization of the holding magnet 106 and resulting further in the deenergization of the armature 114, so that the vehicle inductor circuit when opened remains open to effect the persisting deenergization of the holding magnet in the absence of a modifying operation of the armature 114, as under favorable roadside conditions.

When the roadside condition is "clear", the receiving inductator 44 will receive an impulse to energize the armature 129 with energy of a given phase, this in association with the energization of the field 130 connected to the conductors 118 and 121 by means of conductors 131 and 132, causing the contacts 1, 2 and 3 to close momentarily. The closing of the contacts 1 and 2 closes a circuit to the operating magnet 104, said circuit comprising the operating magnet 104, conductor 133, conductor 134, contact 1, conductor 135, conductor 110, battery 12', resistance r, conductor 14, conductor 108, conductor 136, contact 2, conductor 137, conductor 138, and locking magnet 139. When the inductor 44, however, as under "caution" conditions, receives energy of an opposite phase, the phase of the energizing currents in the relay elements 129 and 130 is displaced so that instead of contacts 1, 2 and 3 being closed, contacts 4, 5 and 6 are closed, the closing of contacts 4 and 5 reversing the connections between the operating magnet 104 and the battery 12', the conductors 140 and 141 which connect to the contacts 4 and 5 being to this end connected to the conductors 133 and 138 reversely relatively to the connections of the conductors 134 and 137.

To restore the operation of the holding means 106 when the indicating means is reset in either the "clear" or "caution" positions, the armature 114 of the relay 116 is connected to be operated by the contact 3 under "clear" conditions by means of the circuit including the armature 114, conductors 125 and 126, inductors 61', 61, conductor 121', conductor 149, conductor 142, contact 3, conductor 143, conductor 144, and conductor 124. Under "caution" conditions the restoration of the armature 114 is by means of the circuit including the armature, conductors 125 and 126, inductors 61', 61, conductors 121', 149 and 142, contact 6, and conductors 145, 144 and 124.

The operation of the system shown in Fig. 3 is therefore substantially the same as that shown in Fig. 1. The holding magnet 106 which maintains the operated parts in either the "clear" or "caution" position while the train is running between control stations is intermittently influenced to release the armature 135 and the indicating means 15 operated thereby so as to permit freedom of motion of the same in response to the selective actuation of the operating magnet 104, this latter being energized from the battery 12' either with current of a given direction or with current having a direction opposite to said given direction, depending upon whether the inductor 44 receives energy from the roadside in a given phase or in an opposite phase. Here also, as in the system shown in Fig. 1, when the holding magnet 106 is deenergized and no impulse is transmitted to the inductor 44, the deenergization of the magnet 106 will persist and the operation of the said holding magnet will be restored only when the inductor 44 receives energy of either the given or the opposite phase.

While I have described my invention in the preferred form, it will be apparent that numerous changes and modifications may be made in the structure disclosed without departing from the spirit of the invention, defined in the following claims.

I claim:

1. In an inductive train control system, vehicle carried mechanism including an indicating means movable into a position for indicating a given roadside condition, an electromagnetic operating means therefor for moving the same to such position and an electromagnetic holding means independent of the operating means for holding the indicating means in such position, cooperative vehicle and roadside inductive mechanism for rendering the holding means inoperative so as to trip the indicating means and for actuating the operating means to reset the indicating means, and means whereby the holding means will persist in inoperative condition in the absence of actuation of the operating means and whereby the operation of the holding means will be restored when the indicating means has been reset.

2. In an inductive train control system, vehicle carried mechanism including an indicating means movable in accordance with roadside conditions into "clear" and "nonclear" positions, an electromagnetic operating means therefor for moving the same to the "clear" position and an electromagnetic holding means independent of the operating means for holding the indicating means in such "clear" position, cooperative vehicle and roadside inductive mechanism intermittently active in the movement of the vehicle for rendering the holding means inoperative so as to trip the indicating means, additional vehicle and roadside inductive mechanism for actuating the operating means to reset the indicating means if the roadside condition is "clear," and means whereby the holding means will persist in inoperative condition in the absence of actuation of the operating means and whereby the operation of the holding means will be restored when the indicating means has been reset.

3. In an inductive train control system, vehicle carried mechanism including an indicating means movable into a position for indicating a given roadside condition, a circuit including electromagnetic operating means for moving the indicating means to such position, a second circuit independent of the first circuit including an electromagnetic holding means for holding the indicating means in such position, cooperative vehicle and roadside inductive mechanism for rendering the circuit of the holding means inoperative so as to trip the indicating means and for actuating the operating means to reset the indicating means, and means whereby the circuit of the holding means will persist in inoperative condition in the absence of actuation of the operating means and whereby the operation of the holding means will be restored when the indicating means has been reset.

4. In an inductive train control system, vehicle carried mechanism including an indicating means movable into a position for indicating a given roadside condition, a circuit including electromagnetic operating means for moving the indicating means to such position, a second circuit independent of the first circuit including an electromagnetic holding means for holding the indicating means in such position, cooperative vehicle and roadside inductive mechanism intermittently active in the movement of the vehicle at control stations along the roadside for rendering the holding means inoperative so as to trip the indicating means and for actuating the operating means to reset the indicating means, the said holding means circuit including a stick contact controlled by the operating means whereby the holding means will persist in inoperative condition between control stations in the absence of actuation of the operating means and whereby the operation of the holding means will be restored when the indicating means has been reset.

5. In an inductive train control system, vehicle carried mechanism including an indicating means movable into a given position, an operating means therefor for moving the same to such position and a holding means independent of the operating means for holding the indicating means in such position, means for controlling the operation of the holding means including a vehicle carried energizing inductor and roadside mechanism for influencing the inductor to render the said holding means inoperative so as to trip the indicating means and means for determining the further operation of the indicating means including cooperating vehicle and roadside inductors associated with so as to be energized by said vehicle energizing inductor.

6. In an inductive train control system, vehicle carried mechanism including an indicating means movable into a given position, an operating means therefor for moving the same to such position and a holding means independent of the operating means for holding the indicating means in such position, means for controlling the operation of the holding means including a vehicle carried energizing inductor and roadside mechanism spaced along the roadbed and intermittently effective for influencing the inductor to render the said holding means inoperative so as to trip the indicating means and means for determining the further operation of the indicating means including cooperating vehicle and roadside inductors associated with so as to be energized by said vehicle energizing inductor.

7. In an inductive train control system, vehicle carried mechanism including an indicating means movable into "clear" and "nonclear" positions, an operating means therefor for moving the same to the "clear" position and a holding means independent of the operating means for holding the indicating means in such "clear" position, means for controlling the operation of the holding means including a vehicle carried energizing inductor and roadside mechanism for influencing the inductor to render the said holding means inoperative so as to trip the indicating means and means including cooperating vehicle and roadside inductors associated with so as to be energized by said vehicle energizing inductor for resetting the indicating means to the "clear" position if the roadside condition is "clear".

8. In an inductive train control system, vehicle carried mechanism including an indicating means movable into "clear", "caution" and "danger" positions, an operating means therefor for moving the same to either the "clear" or "caution" position and a holding means independent of the operating means for holding the indicating means in such "clear" or "caution" position, means for controlling the operation of the holding means including a vehicle carried energizing inductor and roadside mechanism for influencing the inductor to render the said holding means inoperative so as to trip the indicating means and means including cooperating vehicle and roadside inductors associated with so as to be energized by said vehicle energizing inductor for selectively resetting the indicating means to either the "clear" or "caution" position depending upon roadside conditions.

9. In an inductive train control system, vehicle carried mechanism including an indicating means movable into a given position, an operating means therefor for moving the same to such position and a holding means independent of the operating means for holding the indicating means in such position, means for controlling the operation of the holding means including a vehicle carried energizing inductor and roadside mechanism for influencing the inductor to render the said holding means inoperative so as to trip the indicating means and means for actuating the operating means to reset the indicating means including cooperating vehicle and roadside inductors associated with so as to be energized by said vehicle energizing inductor, and mens whereby the holding means will persist in inoperative condition in the absence of actuation of the operating means and whereby the operation of the holding means will be restored when the indicating means has been reset.

10. In an inductive train control system, vehicle carried mechanism including an indicating means selectively movable in accordance with roadside conditions into either of two active positions, an operating means therefor for moving the same to either of such positions and a holding means independent of the operating means for holding the indicating means in either of such positions, and cooperative vehicle and roadside inductive mechanism for rendering the holding means inoperative so as to trip the indicating means and for actuating the operating means to move the indicating means to either of its selected active positions.

11. In an inductive train control system, vehicle carried mechanism including an indicating means selectively movable in accordance with roadside conditions into either of two active positions, an operating means therefor for moving the same to either of such positions and a holding means independent of the operating means for holding the indicating means in either of such positions, cooperative vehicle and roadside inductive mechanism for rendering the holding means inoperative so as to trip the indicating means and additional cooperative vehicle carried and roadside inductive mechanism for actuating the operating means to move the indicating means to either of its selected active positions.

12. In an inductive train control system, vehicle carried mechanism including an indicating means selectively movable into either of two active positions, an operating means therefor for moving the same to either of such positions and a holding means independent of the operating means for holding the indicating means in either of its selected positions, cooperative vehicle and roadside inductive mechanism for rendering the holding means inoperative so as to trip the indicating means and for momentarily actuating the operating means to move the indicating means to its selected active position, and means whereby the operation of the holding means will be restored after said momentary actuation of the operating means.

13. In an inductive train control system, vehicle carried mechanism including an indicating means selectively movable into either of two active positions, an operating means therefor for moving the same to either of such positions and a holding means independent of the operating means for holding the indicating means in either of its selected positions, cooperative vehicle and roadside inductive mechanism for rendering the holding means inoperative so as to trip the indicating means, additional cooperative vehicle and roadside inductive mechanism for momentarily actuating the operating means to move the indicating means to its selected active position, and means whereby the operation of the holding means will be restored after said momentary actuation of the operating means.

14. In an inductive train control system, vehicle carried mechanism including an indicating means movable into "clear" and "caution" indicating positions, an operating means therefor for moving the same to either of said positions and a holding means independent of the operating means for holding the indicating means in either of such positions, and cooperative vehicle and roadside inductive mechanism for rendering the holding means inoperative so as to trip the indicating means and for selectively actuating the operating means to move the indicating means to either the "clear" or "caution" position depending upon the roadside condition.

15. In an inductive train control system, vehicle carried mechanism including an indicating means movable into "clear", "caution" and "danger" positions, an operating means therefor for moving the same to the "clear" or "caution" position, and a holding means independent of the operating means for holding the indicating means in either the "clear" or "caution" position, and cooperative vehicle and roadside inductive mechanism for rendering the holding means inoperative so as to trip the indicating means to move the same to the "danger" position and for actuating the operating means to move the indicating means to the "clear" or "caution" position depending upon the roadside condition.

16. In an inductive train control system, vehicle carried mechanism including an indicating means movable into "clear", "caution" and "danger" positions, an operating means therefor for moving the same to the "clear" or "caution" position, and a holding means independent of the operating means for holding the indicating means in either the "clear" or "caution" position, and cooperative vehicle and roadside inductive mechanism for rendering the holding means inoperative so as to trip the indicating means to move the same to the "danger" position and additional cooperative vehicle carried and roadside inductive mechanism for actuating the operating means to move the indicating means to the "clear" or "caution" position depending upon the roadside condition.

17. In an inductive train control system, vehicle carried mechanism including an indicating means movable into "clear", "caution" and "danger" positions, an operating means therefor for moving the same to the "clear" or "caution" position, and a holding means independent of the operating means for holding the indicating means in either the "clear" or "caution" position, cooperative vehicle and roadside inductive mechanism for rendering the holding means inoperative so as to trip the indicating means to move the same to the "danger" position and for actuating the operating means to move the indicating means to the "clear" or "caution" position depending upon the roadside condition, and means whereby the holding means will persist in an inoperative condition in the absence of actuation of the operating means and whereby the operation of the holding means will be restored when the indicating means has been reset either to the "clear" or "caution" position.

18. In a train control system, vehicle carried mechanism comprising a movable indicating means, an operating magnet therefor, a holding magnet therefor independent of the operating magnet for normally holding the indicating means in position, an inductive circuit for normally effecting the energization of the holding magnet and adapted to be influenced for rendering the said holding magnet inoperative, and an independent inductive circuit for determining the actuation of the operating magnet when the holding magnet is rendered inoperative.

19. In an inductive train control system, vehicle carried mechanism including an indicating means movable into a position for indicating a given roadside condition, an electromagnetic operating means therefor for moving the same to such position and an electromagnetic holding means independent of the operating means for holding the indicating means in such position, and cooperative vehicle and roadside inductive mechanism for rendering the holding means inoperative so as to trip the indicating means, providing the block ahead is occupied and for leaving the holding means operating so as not to trip the indicating means providing the block ahead is unoccupied, and cooperative vehicle and roadside inductive mechanism for resetting the indicating means.

20. In an inductive train control system, vehicle carried mechanism including an indicating means movable into "clear", "caution" and "danger" positions, an operating means therefor for moving the same to the "clear" or "caution" positions, and a holding means independent of the operating means for holding the indicating means in either the "clear" or "caution" position, and cooperative vehicle and roadside inductive mechanism for rendering the holding means inoperative so as to trip the indicating means to move the same to the danger position.

21. In a train control system, a normally energized vehicle carried element supplied with A. C., a roadside element inductively associated with the vehicle element, a train control phase relay controlled by the power factor of the vehicle element, and a detent for the phase relay releasable by coaction of the vehicle and roadside elements.

Signed at Chicago, in the county of Cook and State of Illinois this 12th day of October A. D. 1923.

ARCHIBALD G. SHAVER.